United States Patent [19]

Zinkann et al.

[11] 4,362,422
[45] Dec. 7, 1982

[54] GRATING FASTENER

[76] Inventors: Paul J. Zinkann, 14 Klonteska Ct., Brevard, N.C. 23712; David R. Tuttle, 719 Creekside Dr., Aurora, Ohio 44202; Thomas G. Tuttle, 32247 B Hamilton Dr., Solon, Ohio 44139

[21] Appl. No.: 186,500

[22] Filed: Sep. 12, 1980

[51] Int. Cl.³ .............................................. F16B 2/12
[52] U.S. Cl. ...................................... 403/387; 52/507
[58] Field of Search .................... 403/387, 400, 24; 52/507, 581

[56] References Cited

U.S. PATENT DOCUMENTS

| 1,707,533 | 4/1929 | Nagin | 52/581 |
| 2,403,842 | 7/1946 | Bates | 403/387 X |
| 2,467,877 | 4/1949 | Barry | 52/507 |
| 2,572,432 | 10/1951 | Bates | 52/507 |
| 3,011,234 | 12/1961 | Fiddler . | |
| 3,367,078 | 2/1968 | Thompson, Jr. | 52/507 |
| 3,466,829 | 9/1969 | Robicheaux | 52/507 X |
| 4,180,343 | 12/1979 | Finlay | 52/507 X |

FOREIGN PATENT DOCUMENTS

| 40096 | 3/1972 | Australia . |
| 181950 | 5/1955 | Fed. Rep. of Germany . |
| 2207231 | 11/1972 | France . |
| 2042617 | 12/1978 | United Kingdom . |

*Primary Examiner*—Andrew V. Kundrat
*Attorney, Agent, or Firm*—Meyer, Tilberry & Body

[57] ABSTRACT

A grating fastener is provided having a base member, a saddle clamp and a swivel clamp rotatably mounted on the base member and spring biased perpendicular to the base member for ease of installation. The fastener is easily installed by rotating the swivel clamp parallel to the base member and inserting the assembly between two adjacent bearing bars and allowing the swivel clamp to spring to its engaged position automatically engaging the bottoms of two adjacent bearing bars. The saddle clamp engages the tops of the same two bearing bars engaged by the swivel clamp.

17 Claims, 8 Drawing Figures

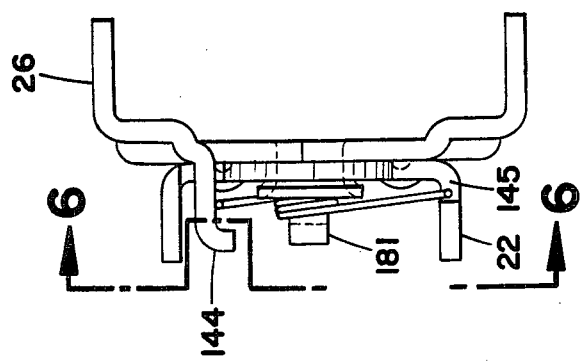
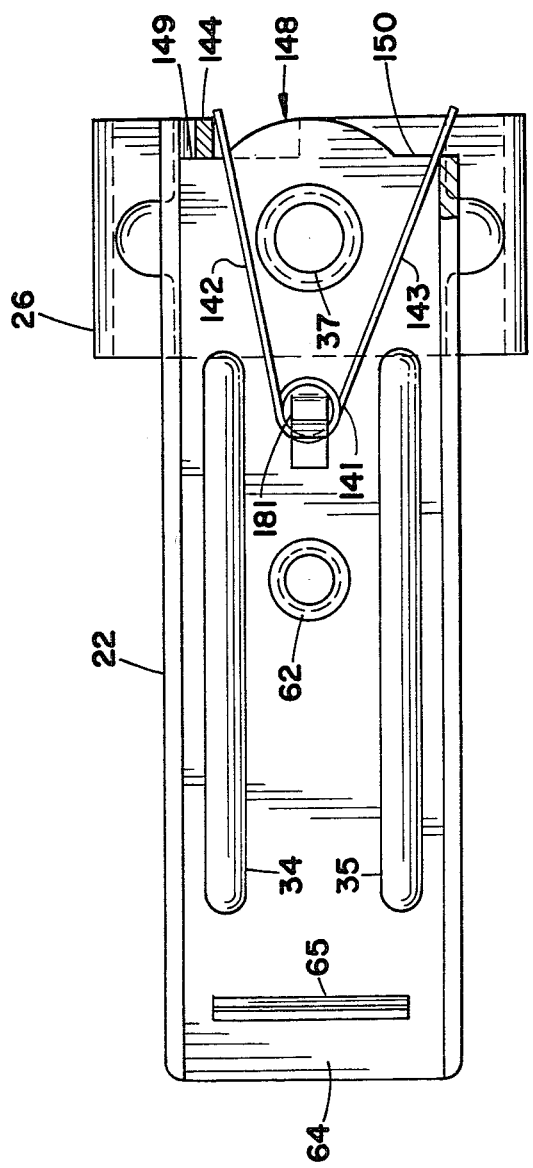
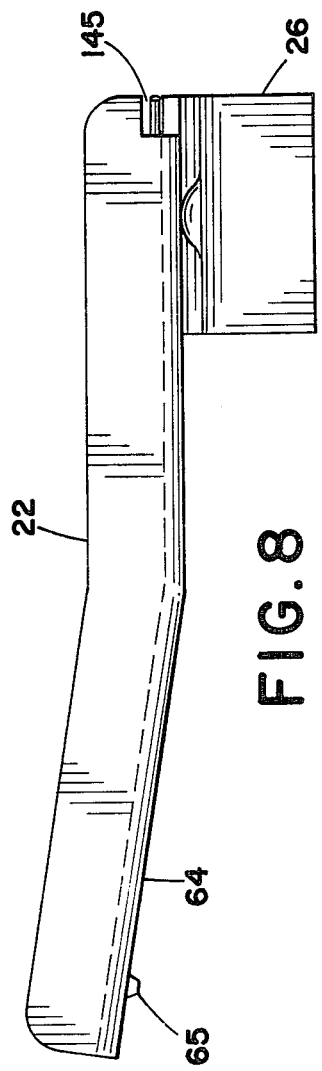

GRATING FASTENER

This invention relates to the art of fasteners and more particularly to fasteners used to attach metallic grating to supporting structural members.

The invention is particularly applicable in the installation of standard metal bar gratings on support members such as I-beams so as to be easily removable yet tightly fixed to the support and will be described with specific reference to standard metal bar gratings such as those specified in Standards Manuals published by the National Association of Architectural Metal Manufacturers, however, it should be appreciated that the invention has applicability to other gratings and platforms having apertures between support members.

Metal bar gratings are normally constructed as open grids having parallel spaced load supporting bearing bars interconnected by cross bars running perpendicular thereto or sinuously bent reticuline bars extending between adjacent bearing bars, alternately connected to the bearing bars.

Attachment of grating elements to their support members has been effected in the past by welding or various clips. One such attachment means is a saddle clip comprised of sheet metal pressed to have two downwardly facing channels spaced apart to fit over two adjacent bearing bars of the grating and a connecting portion between these two channel members. The clip is placed over two adjacent bearing bars and a nut fastens the clip to an upstanding stud welded to the supporting angle iron.

A second type of fastener is described in U.S. Pat. No. 2,467,877 to Barry. This fastener includes an elongated base member with a longitudinal slot near its center which slidingly accommodates a bolt and nut. The bolt and nut is also fixed to a hook element which engages a single bearing bar by hooking over its top. One end of the base member is provided with an upstanding lip and the other end is provided with a rotatale flat swivel clamp having an upstanding lip on one end thereof. The swivel clamp is rotated to a position parallel to the base member and passed through the space between two bearing bars. The swivel clamp is then hand rotated to a perpendicular position so as to bridge the underside of two adjacent bearing bars and the hook element placed over one of these bearing bars. The upstanding lip on the base member is positioned to engage an angle iron and a special tool inserted down through the slot in the base member allowing the installer to tighten the bolt and nut. Careful manipulation of the parts of this device are required to properly align it in installation. Further, as the bolt is tightened, the anchor plate will deform because of its small cross-section adjacent the slot. Because the hook member only engages the top of one bearing bar, unbalanced forces are present in the tightened fastener which can result in deformation of the device possibly affecting security of the connections.

Other types of clips have been proposed for securing gratings. None supply the advantages of the present invention. Representative clips are illustrated in U.S. Pat. No. 3,466,829 to Robicheaux; U.S. Pat. No. 3,367,078 to Thompson, Jr.; U.S. Pat. No. 3,011,234 to Fiddler; U.S. Pat. No. 2,572,432 to Bates; and U.S. Pat. No. 2,403,842 to Bates.

SUMMARY OF THE INVENTION

The present invention provides a new and improved fastener for gratings which overcomes all of the above referred to objections and others and provides a fastener which is easily and readily installed, is economical to manufacture and can be readily removed.

In accordance with the present invention, a grating fastener is provided comprised of an elongated base member, an upper clamp and a swivel clamp rotatably supported on one end thereof which swivel clamp is spring biased so as to be held by a rotation stop perpendicular to the base member.

Further in accordance with the present invention, two rotation stops are provided between the swivel clamp and the base member offset 90° from one another whereby swivel clamp is positively stopped in either the engagement position or perpendicular to the engagement position for passing between two adjacent bearing bars.

Yet further in accordance with the present invention, a fastener is provided having a balanced saddle clamp engaging the tops of two adjacent bearing bars connected to a base member by means of a threaded fastener, and a balanced swivel clamp spring biased into a position which will engage the underside of the same two bearing bars engaged by the saddle clamp.

Further in accordance with the invention, an engagement portion is provided on the base member slanting 7° downwardly away from the underside of the bearing bars engaged.

OBJECTS

It is the primary object of the present invention to provide a grating fastener of superior strength, ease of installation and holding power.

A further object of the invention is the provision of a grating fastener which is balanced in its loading in the installed position and will not be dislodged by vibration or lateral forces applied to the grating.

Another object of the invention is to provide a grating clamp which may easily be installed in one piece from the top of a grating and does not require the use of power tools for installation or removal.

Another object of the invention is to provide a grating fastener which can be repeatedly fastened and unfastened from a grating without significant deformation or degradation of the fastening function.

The invention may take physical form in certain parts and arrangements of parts, a preferred embodiment of which will be described in detail in this specification and illustrated in the accompanying drawings which form a part hereof and wherein:

FIG. 6 is a bottom plan view of a second embodiment of the invention with a portion cut away for clarity and the saddle clamp removed;

FIG. 7 is an end view of the device of FIG. 6; and,

FIG. 8 is a side view of the device of FIG. 6.

PREFERRED EMBODIMENT OF THE INVENTION

Figure 1:
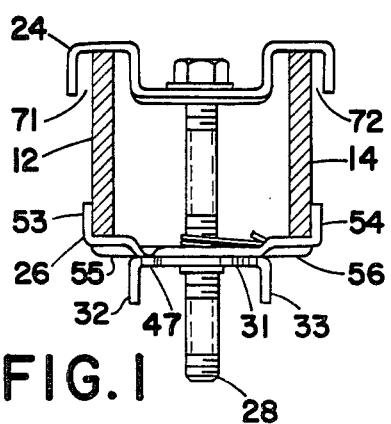
FIG. 1 is an end view of a grating fastener engaged to a grating and showing two bearing bars in section.
Figure 2:
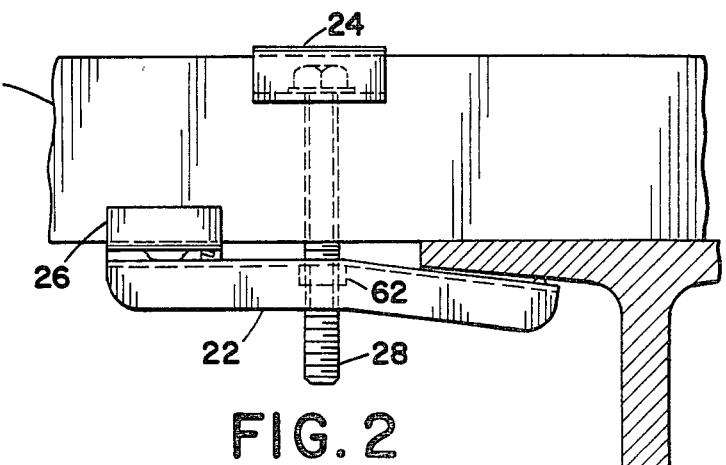
FIG. 2 is a side elevation of the device of FIG. 1 with the I-beam on which the grate is supported shown in section.
Figure 3:
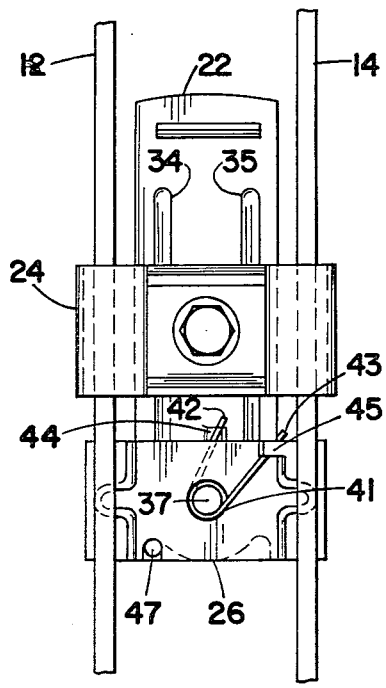
FIG. 3 is a top plan view of the clamp of FIG. 1 (the I-beam has been deleted for clarity)

Referring now to the drawings wherein the showings are for the purposes of illustrating a preferred embodiment of the invention only and not for the purpose of limiting same, FIG. 1 shows a grating fastener 10 engaging two bearing bars 12, 14 of a metallic grating. These metallic gratings come in various types and sizes having a given spacing between bearing bars. The bearing bars in the gratings also vary in size. The fastener of the present invention can be fabricated in a number of different sizes to accommodate different spacing between bearing bars and will also accommodate various vertical heights of the bar.

In the embodiment shown, grating fastener 10 is comprised of a base member 22, a saddle clamp 24, a swivel clamp 26 and a machine screw 28. All of the major components, save the machine screw, are fabricated from 16 gauge steel. The base member has a channel like cross-section with a wide horizontal portion 31 and two outboard downwardly extending vertical legs 32, 33. Two longitudinal ribs 34, 35 are pressed into base member 22 along both edges to add strength and stiffness.

Swivel clamp 26 has a central aperture 37 through which it is fixed to one end of base member 22. A downwardly extending collar is punched through swivel clamp 26 which is then fitted to the base member and peened outwardly forming a retaining aperture-neck connection 38. This aperture-neck connection allows free rotation and provides an ideal position for the installation of a biasing spring 41. Biasing spring 41 is disposed in aperature neck connection 38 and has two ends 42, 43 which are retained in tabs 44 and 45 on the base member 22 and swivel clamp 26 respectively.

A downwardly extending projection 47 on the swivel clamp 26 rides in an arcuate race 48 having two stops 49, 50 in the base member 22. The arcuate race 48 is concentric with the aperture-neck connection 38 between the swivel clamp 26 and the base member 22 allowing smooth rotation for 90°. Stops 49, 50 prevent rotation beyond this 90° arc. Spring 41 biases the swivel clamp 26 such that projection 47 is normally held against stop 50 and swivel clamp 26 is held perpendicular to the base member 22 which is the proper position for engagement of swivel clamp 26 with the underside of two bearing bars 12, 14 in a grating.

Swivel clamp 26 is provided with two upstanding ears 53, 54 which will engage the outboard sides of two bearing bars and ridges 55, 56 strengthening the swivel clamp against bending.

Machine screw 28 affixes saddle clamp 24 to the base member 22 by means of an aperture in the saddle clamp and a threaded aperture 62 in the base member.

Figure 4:
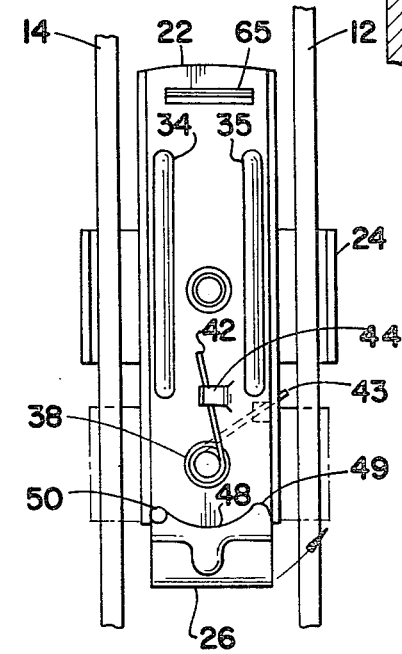
FIG. 4 is a bottom plan view of the grating fastener in its disengaged position being inserted between two bearing bars.
Figure 5:
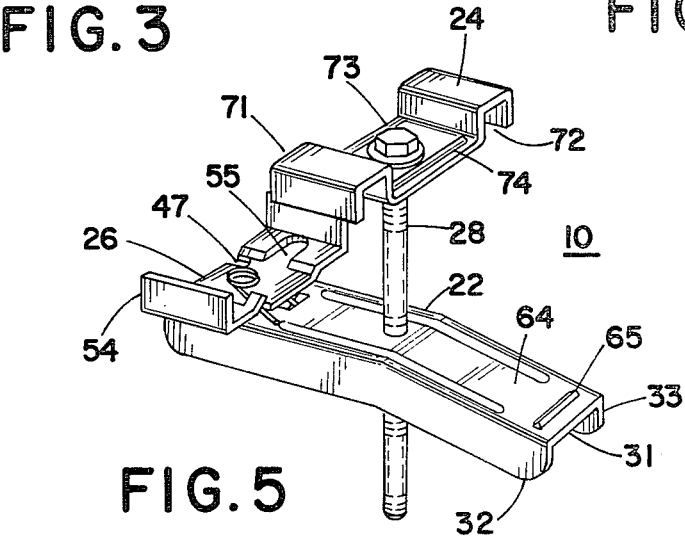
FIG. 5 is a perspective view of the grating fastener.

In operation, a grating is placed on its support members and positioned as desired. Clamp 10 is prepared by loosening machine screw 28 sufficiently to allow clearance between swivel clamp 26 and saddle clamp 24 to accommodate the height of bearing bars 12, 14. Swivel clamp 26 is then rotated to the disengaged position shown in FIG. 4 and the base member swivel clamp assembly is lowered between two adjacent bearing bars 12, 14 near the support member 16. Saddle clamp 24 is positioned to engage bearing bars 12, 14. Once the swivel clamp 26 is between the two bearing bars, it can be released as the bearing bars will prevent its rotation from the disengaged position. As the swivel clamp 26 emerges at the bottom side of the bearing bars 12, 14 it will spring into the engaged position. The entire grating fastener 10 is then slid toward the support member 16 until engagement area 64 of base member 22 engages the underside of I-beam 16. Engagement area 64 extends across the entire width of base member 22 and downwardly at an angle of 7° from the plane defined by the bottom of the grating and the top of the remaining section of the bsse member 22. This 7° downward angle matches the standard angle of I-beam flange lower surfaces, maximizing the area of contact between the engagement area and the underside of the I-beam 16. Machine screw 18 is tightened, pulling the engagement area 64 against the I-beam lower surface and swivel clamp 26 against the underside of bearing bars 12, 14. The two downwardly facing channels 71, 72 on saddle clamp 24 are pulled downwardly against these same two bearing bars 12, 14. The fastener 10 is securely fixed to both the grating and the support 16, thus fixing the grating in place. As engagement area 64 is nearly as wide as the space between two adjacent bearing bars and both swivel clamp 26 and saddle clamp 24 both engage bearing bars on opposite sides of engagement area 64, fastener 10 will not twist or lose its grip if forces or impacts are applied to it in a direction perpendicular to the bearing bars.

An engagement ridge 65 is provided near the outboard end of the engagement area which will engage grooves which are commonly positioned in the underside of aluminum extrusion supports, improving gripping action in these applications.

The intermediate portion of saddle clamp 24 is spaced downwardly from the top of bearing bars 12, 14 such that machine screw 28 will not form a hazard to traffic and two ridges 73, 74 are provided along this intermediate portion to strengthen saddle clamp 24 and prevent it from bending when tightened.

When it is desired to remove a section of grating for access to an area below or for any other reason, it is a simple matter to loosen the machine screw 28 and slide the entire fastener 10 away from the support member 16. The fastener 10 may also be easily removed by rotating the swivel clamp 26 to the disengaged position and removing the fastener. The fastener 10 may then be set aside for reuse when the grating is repositioned.

A second embodiment of the present invention is illustrated in FIGS. 6, 7 and 9. These figures show a modified base member 22 and swivel clamp 26 and omit the saddle clamp 24 and machine screw 28. The saddle clamp 24 and machine screw 28 used with the second embodiment are identical in all respects to those illustrated with respect to the first embodiment.

Swivel clamp 26 is mounted to base member 22 with the peened collar through a central aperture 37 in a manner identical to that shown in the first embodiment. The second embodiment differs from the first embodiment in means of mounting spring 141 and providing stops defining the engaged and disengaged position of the swivel clamp 26 with respect to the base member 22.

Spring 141 has two ends 142, 143. End 142 is retained against tab 144, as best seen in FIG. 7 and also seen in section in FIG. 6. Spring end 143 is retained on the side of base member 22 opposite tab 144 in slot 145. The central return bent portion of spring 141 is retained over tab 181.

This modified structure provides the same spring biased swivel action for the swivel clamp 26 with respect to the base member 22 as the first embodiment, however, the stop elements differ from the first embodiment and operate and interact in a different manner.

Tab 144 performs two functions in the second embodiment. First, tab 144 retains spring end 142 and second, tab 144 interacts with stops 149 and 150 in a manner similar to projection 47 in the first embodiment. Tab 144 thereby performs a double function.

Spring 141 is also mounted in a different manner in the second embodiment than in the first embodiment. By mounting the coiled central portion of spring 141 over tab 181 and butting end portion 143 against slot 145, both end portions 142 and 143 can be disposed on the same side of base member 22. This results in easier assembly of the device. Further, as the spring does not have to be specially adapted to pass through the central aperture 37, the spring is a less complex design even further easing assembly. Also, the legs 142 and 143 of the modified spring 141 are longer than the corresponding legs in the first embodiment thereby allowing use of a spring exerting less torque at its central coiled portion while maintaining the same force at the leg ends. A smaller spring is thereby usable.

While numerous advantages of the second embodiment have been described, the first embodiment also has advantages, such as the positive retention of the spring main body portion within the aperture 37 making loss of the spring almost impossible.

The invention has been described in detail with respect to two preferred embodiments. It is to be understood that this detailed description is by way of example only. Many changes and modifications will be apparent to those skilled in the art upon careful reading of this specification without departing from the spirit and scope of the invention. For example, the material from which the major components is fabricated can be altered to meet user needs. Steel of a heavier or lighter gauge can be used as loading demands or alloys such as stainless steel can be used to provide fasteners in corrosive environments. Further, different surface texturing can be embossed into engagement area 64 for better gripping of specialized supports. It is intended to cover all modifications and changes that fall within the scope of the appended claims.

Having thus described the invention, the following is claimed:

1. In a fastening device for fastening a parallel bar grating to a support member comprising: a base member having a width less than the spacing between adjacent grating bars, an aperture disposed centrally in said base member and an engagement portion disposed on a first end of said base member; an upper clamp adapted to engage the top of a bearing bar; a threaded fastening means passing through said upper clamp and engaging said base member; and a swivel clamp having a length greater than the spacing of adjacent bars and adapted to engage the bottoms of two adjacent bars and being rotatably mounted on said base member on an end opposite to said engagement portion, the improvement which comprises: spring means biasing said swivel clamp against a first rotation stop in said engaged position and said swivel clamp being rotatable against said spring bias to a second position parallel to said base member such that said base member and said swivel clamp may be passed through adjacent bearing bars.

2. The improvement of claim 1 wherein a second rotation stop is provided on said base member preventing sai swivel clamp from rotating more than one quarter turn from said engaged position.

3. The improvement of claim 2 wherein said swivel clamp is mounted to said base member by means of a downwardly extending hollow neck portion on said swivel clamp retained in an aperture on said base member, said biasing spring being disposed within said hollow neck portion.

4. The improvement of claim 3 wherein said base member has an arcuate race disposed concentric with said neck and aperture mounting means and said swivel clamp has a projection riding in said race, said first and second stops formed by the ends of said race and spaced one quarter turn apart.

5. The improvement of claim 4 wherein said upper clamp is comprised of two downwardly facing channels spaced to engage two adjacent bearing bars interconnected by an intermediate portion.

6. The improvement of claim 5 wherein both longitudinal edges of said base member extend downwardly whereby said base member has a channel like cross-section.

7. The improvement of claim 6 wherein the upper surface of said base member engagement portion intersects the upper surface of the remainder of said base member at an angle of approximately 7°.

8. The improvement of claim 7 wherein the upper surface of said engagement portion is provided with an upstanding ridge substantially across its entire width.

9. The improvement of claim 2 wherein said base member is provided with a spring retaining tab retaining said spring means, and a slot retaining a first end of said spring means; said swivel clamp is provided with a downwardly extending tab means engaging a second end of said spring means and adapted to engage said first and second rotation stops disposed on said base member.

10. The improvement of claim 9 wherein said base member has an arcuate race disposed concentric with said neck and aperture mounting means and said first and second rotation stops are disposed at the end of said race spaced one quarter turn apart.

11. The improvement of claim 10 wherein said upper clamp is comprised of two downwardly facing channels spaced to engage two adjacent bearing bars interconnected by an intermediate portion.

12. The improvement of claim 11 wherein both longitudinal edges of said base member extend downwardly whereby said base member has a channel like cross-section.

13. The improvement of claim 12 wherein the upper surface of said base member engagement portion intersects the upper surface of the remainder of said base member at an angle of approximately 7°.

14. The improvement of claim 13 wherein the upper surface of said engagement portion is provided with an upstanding ridge substantially across its entire width.

15. A fastening device for fastening a parallel bar grating to a support member comprising: a base member having a first end and a second end, a width less than the spacing between adjacent grating bearing bars, a threaded aperture in and disposed generally centrally of said base member and an engagement portion disposed on said first end of said base member; a saddle clamp having two downwardly opening recesses spaced to engage adjacent grating bars and an aperture disposed centrally in said saddle clamp; a threaded fastener passing through said saddle clamp central aperture and threadably engaging said base member threaded aperture; a swivel clamp having upstanding ears spaced to engage the outsides of two adjacent grating bars in the engaged position and being rotatably mounted on said base member second end, said swivel clamp being rotatably mounted on said base member by means of a hollow neck portion on said swivel clamp retained in an aperture in said base member; a biasing spring disposed within said hollow neck portion; said swivel clamp having a projection riding in an arcuate race on said base member concentric with said swivel clamp mounting aperture, said arcuate race having a first stop at one end thereof and a second stop at the other end thereof, said first stop spaced one quarter turn from said second stop; said spring biasing said swivel clamp with respect to said base member such that said projection buts against said first stop and said swivel clamp is biased perpendicular to said base member.

16. The device of claim 15 wherein said base member has two downwardly extending flanges extending along its entire length, one on either side of said member whereby said base member has a channel like cross-section.

17. The device of claim 16 wherein said base member is formed such that the upper surface of said engagement portion intersects the upper surface of the remainder of said base member at an angle of 7°.

* * * * *